United States Patent [19]

Hammer et al.

[11] 4,248,900
[45] Feb. 3, 1981

[54] INTERNALLY COATED TUBULAR CASING AND PROCESS FOR THE MANUFACTURE THEREOF

[75] Inventors: Klaus-Dieter Hammer, Mainz; Günter Gerigk, Oberursel; Max Bytzek, Naurod, all of Fed. Rep. of Germany

[73] Assignee: Hoechst Aktiengesellschaft, Frankfurt am Main, Fed. Rep. of Germany

[21] Appl. No.: 50,086

[22] Filed: Jun. 19, 1979

[30] Foreign Application Priority Data

Jun. 24, 1978 [DE] Fed. Rep. of Germany ....... 2827862

[51] Int. Cl.³ .................. A23G 1/00; B32B 9/06; B05D 3/02; A23L 1/31
[52] U.S. Cl. .................. 426/105; 138/118.1; 426/135; 427/356; 427/385.5; 428/36; 428/498; 428/499
[58] Field of Search .............. 426/105, 135, 127; 427/355, 356, 385 R; 428/36, 498, 499; 138/118.1

[56] References Cited

U.S. PATENT DOCUMENTS

| 2,866,710 | 12/1958 | Dowd et al. ........................ 428/36 |
| 2,901,358 | 8/1959 | Underwood et al. .............. 138/118.1 |
| 3,378,379 | 4/1968 | Shiner et al. ...................... 138/118.1 |
| 3,640,734 | 2/1972 | Oppenheimer et al. ............... 99/176 |
| 3,640,735 | 2/1972 | Oppenheimer et al. ............... 99/176 |
| 3,679,436 | 7/1972 | Oppenheimer et al. ............... 99/176 |
| 3,679,437 | 7/1972 | Oppenheimer et al. ............... 99/176 |
| 3,887,713 | 6/1975 | Rasmussen et al. ................. 426/135 |
| 3,898,348 | 8/1975 | Chiu et al. ........................... 426/413 |
| 3,981,046 | 9/1976 | Chiu ........................................ 17/49 |
| 4,137,947 | 2/1979 | Bridgeford ......................... 426/135 |

FOREIGN PATENT DOCUMENTS

| 1188399 | 3/1959 | France . |
| 723323 | 2/1955 | United Kingdom . |
| 1201830 | 8/1970 | United Kingdom . |
| 1381231 | 1/1975 | United Kingdom . |
| 1393301 | 5/1975 | United Kingdom . |

*Primary Examiner*—William R. Dixon, Jr.
*Attorney, Agent, or Firm*—Schwartz, Jeffery, Schwaab, Mack, Blumenthal & Koch

[57] ABSTRACT

Disclosed is a packaging material, preferably a sausage casing, comprising a layer based on cellulose hydrate, having a coating on one surface, this coating comprising a mixture of chemically different compounds comprising, as the first major component thereof, a natural oil comprising a vegetable oil, a triglyceride mixture of saturated vegetable fatty acids having from about 4 to 14 carbon atoms in their carbon chain, or a mixture thereof, and as the second minor component thereof, a chemically modified starch, a partially saponified polyvinyl alcohol or a micro-crystalline cellulose. Also disclosed is a process for manufacturing such sausage casings.

14 Claims, No Drawings

INTERNALLY COATED TUBULAR CASING AND PROCESS FOR THE MANUFACTURE THEREOF

BACKGROUND OF THE INVENTION

The present invention relates to tubular casings based on cellulose hydrate which carry on their inside surface a coating of a mixture of chemically modified starch and natural oils which can be easily peeled off from the filling mass. Furthermore, the present invention relates to a process for the manufacture of such tubular casings. Finally, the present invention relates to the use of such tubular casings as a packaging material, in particular as an artificial sausage casing which can be easily removed from the sausage mass.

Tubular cellulose hydrate casings, the inside of which is not pre-treated, have only a limited suitability for use as sausage casings, because, in the case of fresh sausage, the sausage mass adheres so firmly to the casing that it is almost impossible to separate the casing from the sausage mass when required. In the case of long-keeping or summer sausages, on the other hand, the adhesion is so slight that the casing already detaches itself from the sausage mass during the drying step when the sausage is prepared. Because it detaches itself from the sausage mass when the summer sausage is dried, the casing does not shrink together with the sausage mass and thus becomes crumpled and unsightly, and such properties impede the sales of the sausage.

It has already been suggested to avoid these drawbacks by providing the inside of cellulose hydrate based casings with a layer comprising chemical compounds which act as release agents, such as long-chain isocyanates, ethylene imines, chromium fatty acid complexes, silicones, perfluorinated chemical compounds, diketenes and the like.

Furthermore, artificial sausage casings for long-keeping sausages based on cellulose hydrate are known which carry on their inside surface a layer comprising albuminous chemical compounds, in order to create a satisfactory adhesion between the sausage mass and the sausage casing. Such albuminous compounds are, e.g., chemically modified proteins, epichlorhydrin/polyamine polyamide resins, urea- or melamine-formaldehyde resins, and the like.

These finishing processes for treating the inside surfaces of artifical sausage casings based on cellulose hydrate have the drawback, however, that they are very expensive, because in most cases specific manufacturing conditions must be maintained for the chemical reaction between the cellulose hydrate and the chemical compounds from which the coating is formed. Furthermore, the known finishing processes invariably require the use of chemical compounds of complicated chemical structure which are relatively expensive.

Frequently, such treatments involve the risk that the cellulose hydrate forming the tubular casing is cross-linked in an undesirable and uncontrollable manner by the use of the above-mentioned chemical compounds, so that the sausage casing becomes brittle and breaks. Thus, holes may appear in the wall of the sausage casing when the casing is used in accordance with its purpose, e.g., shirred into a stick.

SUMMARY OF THE INVENTION

It is therefore an object of the present invention to provide improved tubular casings.

Another object of the invention resides in providing improved tubular casings especially fiber-reinforced cellulose hydrate casings, which carry on their inside surfaces a coating of chemical compounds which are not linked by a chemical reaction to the cellulose hydrate forming the casing, i.e., cross-linking of the cellulose hydrate molecules is ruled out, this coating causing a good release effect between the casing and the filling mass and simultaneously providing for a good slip and plasticization of the casing.

It is also an object of the invention to provide a tubular casing to be used as a food pack, with the chemical compounds forming the coating being toxicologically safe.

A specific object is the provision of an improved sausage casing.

It is also an object of the invention to provide a method for making the improved tubular casings according to the invention.

In accomplishing the foregoing objects, there has been provided in accordance with one aspect of the present invention a packaging material, preferably in the form of a sausage casing, comprising a layer based on cellulose hydrate, this layer having a coating on one surface, with the coating comprising a mixture of chemically different compounds comprising, as the first, major component thereof a natural oil comprising a vegetable oil, a triglyceride mixture of saturated vegetable fatty acids having from about 4 to 14 carbon atoms in their carbon chain, or a mixture thereof and, as the second minor component thereof, a chemically modified starch, a partially saponified polyvinyl alcohol or a micro-crystalline cellulose. Preferably, the mixture forming the coating comprises between about 20 and 200 mg of the first component and between about 5 and 150 mg of the second component, calculated per square meter of the surface of the cellulose hydrate layer.

In accordance with another aspect of the present invention, there has been provided a process for the preparation of the above-described tubular casings comprising the steps of coating the inside of a tubular casing based on cellulose hydrate with an aqueous liquid comprising from about 0.2 to 8 percent by weight, based on the total weight of the liquid, of a chemically modified starch, a micro-crystalline cellulose or a partially saponified polyvinyl alcohol, and from about 2 to 20 percent by weight, based on the total weight of the liquid, of a natural oil, evaporating the volatile components of the liquid, the quantity of liquid applied being selected so that the coating formed on the surface of the tube after evaporation of the volatile components comprises a mixture of chemical compounds comprising a total of from about 20 to 200 mg of natural oil and a total of from about 5 to 150 mg of a chemically modified starch, a micro-crystalline cellulose, or a partially saponified polyvinyl alcohol, calculated per square meter of the surface of the tubular casing. Optionally, the aqueous liquid further comprises a chemical emulsifier.

Further objects, features and advantages of the present invention will become apparent from the detailed description of preferred embodiments which follows.

DETAILED DESCRIPTION OF PREFERRED EMBODIMENTS

The manufacture of tubular casings based on cellulose hydrate is known and does not form a part of the present invention. Processes for providing cellulose hydrate tubes with inside coatings are also known and have been disclosed, e.g., in British Pat. No. 1,201,830, and in U.S. Pat. Nos. 2,901,358 and 3,378,379; therefore, such processes do not per se form a part of the present invention.

The coating on the inside surface of the tubular casing comprises a mixture of chemical compounds based on natural oils and/or triglyceride mixtures of natural vegetable fatty acids with carbon chains ranging in length from about 4 to 14 carbon atoms, and a second component constituting the minor part of the mixture, which comprises non-reactive hydrophilic, water-soluble or water-swellable chemically modified starch derivatives and/or micro-crystalline cellulose and/or partially saponified water-soluble polyvinyl alcohol, preferably high molecular weight polyvinyl alcohol.

The mixture forming the coating is comprised of from about 20 to 200 mg of the first component and from about 5 to 150 mg of the second component, calculated per square meter of the surface of the cellulose hydrate casing. Preferably, the coating contains between about 20 and 200 mg of a vegetable oil and/or triglyceride mixtures of vegetable fatty acids with 4 to 14 carbon atoms. The starch derivatives form the release agent component and the vegetable oils form the slip agent component of the mixture of chemically different compounds which together forms the coating. The result achieved by the present invention is due to the synergistic effect caused by the inventive combination of starch derivatives and natural vegetable oils.

The following compounds may be used according to the present invention as chemically modified starches: dextrines, dextranes, alkyl starch ethers, carboxymethyl starch ethers, hydroxyalkyl starch ethers, especially methyl starch, ethyl starch, hydroxymethyl starch, hydroxypropyl starch, ethylmethyl starch, and carboxy methyl hydroxyethyl starch. Within the above-mentioned quantitative ratio, any of these starches, or a mixture of several of these starches, may form a part of the mixture from which the coating is formed.

In addition to vegetable oils and/or triglyceride mixtures of vegetable fatty acids with 4 to 14 carbon atoms, which forms the first component, the coating according to the present invention comprising a mixture of chemically different substances may contain micro-crystalline cellulose as the second component. Calculated on its total weight, the first component of the mixture outweighs the second component.

The scope of the present invention also comprises an embodiment wherein the mixture of chemically different substances forming the coating comprises, as the first component, vegetable oils and/or triglyceride mixtures of vegetable fatty acids with 4 to 14 carbon atoms, and, as the second component, a water-soluble polyvinyl alcohol, the first component outweighing the second component, calculated on the total weight of the mixture.

Preferably, such polyvinyl alcohols contain at least about 88 percent, preferably from about 88 to 99 percent of free OH groups, i.e., OH groups which are not esterified. The percentages refer to the total number of OR groups present in the molecule, wherein R stands for hydrogen or an acid group. Polyvinyl alcohols with high molecular weights are preferred. The term "partially saponified polyvinyl alcohols" refers to chemical compounds of the type described on page 2776 of Roempp's "Chemie-Lexikon" (Chemical Dictionary), published by Franckh'sche Verlagshandlung, Stuttgart, 7th Edition, 1977, under the heading "Polyvinylalkohol".

If the chemical substances forming the coating are present in higher concentrations, the effect is not increased, and it may even occur that undesirable jelly or fat depositions form on the inside of the casing.

Natural oils which are particularly preferred are linseed oil, olive oil, sunflower oil, and a triglyceride mixture of saturated vegetable fatty acids with a chain length of from about 4 to 12 carbon atoms, preferably from about 6 to 10 carbon atoms. The oil component of the coating may also comprise a mixture of the above-mentioned preferred natural oils.

Due to the manner in which it is prepared, the coating according to the invention contains a quantity of a chemical emulsifier such that the desirable qualities of the coating or of the tubular casing provided with the internal coating are not affected. Emulsifiers of this type are, e.g., ethoxylates or propoxylates of natural fatty acids, which are obtained, e.g., by saponification of natural oils, such as soybean oil, linseed oil, castor oil and the like, or monoesters or diesters of natural fatty acids with polyhydric alcohols, such as glycerol, pentaerithritol, sorbitol, mannitol and the like. Also there may be used toxicologically safe synthetic emulsifiers of the type which may be legally added to foodstuffs, such as alkyl or alkyl-aryl-sulfates or sulfonates.

The following is a description of the preparation of a tubular casing according to the present invention.

A tubular cellulose hydrate casing prepared in known manner is used as the starting material. By means of one of the above-mentioned known processes, e.g., a section of a given length, e.g. 350 m, of such a tubular casing is continuously coated on its inside surface with an aqueous liquid comprising chemically modified starch and natural oils. The tube is then dried as described and may then be moistened with water in a manner such that the finished tube has a water content in the range from about 8 to 10 percent by weight, calculated on the total weight of the tube.

The aqueous liquid used for coating the inside of the cellulose hydrate tube may be prepared as follows:

Between 2 and 80 g of chemically modified starch, e.g. carboxymethyl starch, is dissolved in 1 liter of water with agitation. A total of 2 to 20 g of a chemical emulsifier, e.g. a reaction product of soybean fatty acid with 12 moles of ethylene oxide, is then added to the solution. Then a total of 20 to 200 g of a natural oil, e.g., sunflower oil, is added to the solution and thoroughly emulsified by vigorous stirring.

The tube is dried at a temperature between about 90° and 120° C. In order to produce stable oil emulsions, between about 5 and 20 percent by weight of emulsifiers, preferably between about 9 and 12 percent by weight, based on the total weight of the oil present, are required.

Ethyoxylated soybean fatty acids (52.5% of linoleic acid, 33.5% of oleic acid, palmitic acid, linolenic acid, and arachidic acid, reacted with 12 moles of ethylene oxide), ethoxylated castor oil acid (86% of castor oil acid, 9% of oleic acid, 2 to 3% of linoleic acid, 2% of stearic acid, reacted with 36 moles ethylene oxide), and ethoxylated oleic acids are particularly advantageous emulsifiers.

If desired, the liquid containing the chemically modified starch and the natural oils may be applied immediately before the tube is shirred into a so-called stick, by means of known shirring processes and shirring apparatuses, for example by spraying the liquid through the hollow shirring mandrel into the interior of the tube which is being shirred.

Tubular casings produced by the present process which are used as artificial sausage casings for fresh sausage can be easily peeled from the sausage mass. No annoying rupture occurs, because the tubular casing will not become brittle.

The tubular casings according to the present invention are particularly suitable for sausages packed in so-called "peelable sausage casings"; the casings of such sausages are mechanically removed from the sausage mass before the sausages are sold or before they are further processed. The ready detachability of the sausage casings according to the present invention from the sausage mass facilitates a smooth mechanical peeling of the tubular casings from the sausage mass, i.e., ruptures caused by the adhesion of sausage mass or damage to the casing by mechanical action do not occur. By the presence of natural oils in the coating, after-treatment and further processing of the casings, e.g. shirring, are also facilitated.

If the tubular casings according to the present invention are wound up into a roll, they do not stick during storage, a property, which is of importance for the subsequent shirring of the sausage casings. Sections of the casings can be easily opened during processing, which is essential if tubular casings of relatively large sizes are processed into artificial sausage casings, because the sausage casings are processed with one end thereof tied. If the tubular casings according to the present invention are to be further processed as artificial sausage casings, it is of importance that the tubes be flexible and soft, for shirring into sticks, for tying, and for further processing of the casings. The casing according to the present invention has these properties to a high degree.

If they are used as artificial sausage casings, the tubular casings according to the present invention fill a gap in the market in that they are particularly suitable for sausages destined for early consumption, e.g., for thick Frankfurters, finely minced pork sausages, coarse and fine mettwurst, and the like.

The coating on the inside of the tubular casing according to the invention does not display the excessive release (lack of adhesion) effect of known hydrophobic layers, or the excessive adhesion of the casing to the sausage mass of known albuminous inside coatings, but is an advantageous combination of release effect and adhesion.

The following examples are illustrative of the present invention.

EXAMPLE 1

(a) 12 g of carboxymethyl starch and 15 g of a reaction product of soybean fatty acid with 12 moles of ethylene oxide are dissolved, while agitating, in 1 liter of water. Then 150 g of a triglyceride mixture of saturated vegetable fatty acids with 4 to 12 carbon atoms (e.g., "Miglykol 812", marketed by Dynamit Nobel AG) is stirred into the solution and carefully emulsified.

(b) The inside of a tubular cellulose hydrate casing is treated as follows: The above described liquid is filled into a section of about 350 m length of a cellulose hydrate tube of size 40 in a manner such that the entire quantity of the liquid is contained within a certain section of the hollow space of the tube. Inside coating of the tube is effected, e.g., in accordance with the process disclosed in British Pat. No. 1,201,830, the disclosure of which is hereby incorporated by reference.

The internally coated tube is then dried by passing it continuously through a tunnel drier at a drying temperature between 90° and 120° C. After leaving the drier, the tube is moistened by spraying it with water in a manner such that the finished sausage casing has a water content of about 8 to 10 percent by weight, based on the total weight of the tube. The tube is then wound onto a roll.

If the thus treated casing is collapsed and handled between thumb and forefinger of one hand, the adjacent inside surfaces of the tube may be easily displaced relative to each other. Even after prolonged storage of the tube, the walls do not stick to each other. The tube may be shirred without difficulties and is not damaged by the shirring process. The sticks produced by shirring can be processed without difficulties on conventional sausage filling machines. The artificial sausage casings may be easily peeled from the sausage or the sausage meat without tearing or sticking to the sausage meat.

EXAMPLE 2

(a) 15 g of propoxylated starch and 1.0 g of a reaction product of castor oil with 36 moles of ethylene oxide are dissolved in 1 liter of water. Then 150 g of a triglyceride mixture of saturated vegetable fatty acids with 4 to 12 carbon atoms (e.g., "Miglykol 812", marketed by Dynamit Nobel AG) is emulsified in the solution with thorough agitation.

(b) A cellulose hydrate tube of size 38, which is still in the gel state, is provided with an inside coating as described in Example 1. A cellulose hydrate tube in the gel state is a cellulose hydrate tube which, without having previously been dried, has a water content of about 300 percent by weight, based on the total weight of the tube.

The resulting product is distinguished by its good processability in the manufacture of sausages and is characterized in that the artificial sausage casing can be easily peeled from the sausage mass when desired, without tearing of the tubular casing or adhesion of the sausage mass to the sausage casing.

EXAMPLE 3

(a) The liquid used corresponds to that used in Example 1.

(b) This solution is also filled into an annular casing (round-shaped cellulose tube) of size 42 before the casing is introduced into the drier and is then dried in a slightly inflated state at a speed of 10 m/min. During shirring, the tube is moistened so that a water content of 16 percent results. If the tube is filled with coarse mettwurst meat, no damage occurs. The casing thus produced can be easily peeled from the sausage mass.

EXAMPLE 4

(a) 20 g of a reaction product of soybean fatty acid with 12 moles of ethylene oxide is dissolved in 1 liter of water while vigorously stirring. Then 120 g of sunflower oil are added to the solution with vigorous agitation and thoroughly emulsified in the solution.

(b) The resulting solution (a) is further processed as described in Example 1.

EXAMPLE 5

Example 4 is repeated except that olive oil is used instead of sunflower oil.

EXAMPLE 6

Example 4 is repeated except that rape oil is used instead of sunflower oil.

EXAMPLE 7

Example 4 is repeated except that palm oil is used instead of sunflower oil.

EXAMPLE 8

Example 4 is repeated except that coconut oil is used instead of sunflower oil.

EXAMPLE 9

Example 4 is repeated except that linseed oil is used instead of sunflower oil.

EXAMPLE 10

A liquid corresponding to liquid (a) of Example 4 is used for coating the inside of a cellulose hydrate tube. The solution is filled into a cellulose hydrate tube in the gel state (size 18) and further processed as described in Example 1. Then the tube is shirred to form a stick. A stick obtained from the tube prepared as described in this example is particularly suitable for the manufacture of sausages casings which must be capable of being easily and rapidly peeled from the sausage mass.

EXAMPLE 11

Example 1 is repeated except that the treating liquid is prepared as follows:

(a) 15 g of polyvinyl alcohol with a saponification degree of 88% (e.g., "Mowiol N 30-88", marketed by Hoechst AG), and 15 g of a reaction product of soybean fatty acid with 12 moles of ethylene oxide are dissolved, with agitation, in 1 liter of water. 160 g of olive oil is added to the solution and carefully emulsified.

(b) The inside surface of the tube is treated as described in Example 1.

EXAMPLE 12

Example 1 is repeated except that the treating liquid is prepared as follows:

18 g of micro-crystalline cellulose ("Avicell", marketed by Rettenmeyer) and 16 g of polyoxy ethylene sorbitan-monooleate ("Tween 80", marketed by Atlas Chemie GmbH) are dissolved in 1 liter of water while stirring. 160 g of olive oil are thoroughly emulsified in this solution by vigorous stirring.

What is claimed is:

1. A packaging material, comprising a layer based on cellulose hydrate, said layer having a coating on one surface, said coating comprising a mixture of chemically different compounds comprising, as the first, major component thereof between about 20 and 200 mg/m$^2$ of a natural oil comprising a vegetable oil, a triglyceride mixture of saturated vegetable fatty acids having from about 4 to 14 carbon atoms in their carbon chain, or a mixture thereof and, as the second, minor component thereof, between about 5 and 150 mg/m$^2$ of a chemically modified starch, a partially saponified polyvinyl alcohol or a microcrystalline cellulose.

2. A packaging material according to claim 1, wherein the mixture of chemical compounds forming the coating comprises a natural oil and a modified starch derivative selected from the group comprising a dextrine, a dextrane, an alkyl starch ether, a carboxymethyl starch and a hydroxyalkyl starch ether.

3. A packaging material according to claim 2, wherein the starch ether comprises methyl starch, ethyl starch, hydroxymethyl starch, hydroxy propyl starch, ethylmethyl starch, or carboxymethyl hydroxyethyl starch.

4. A packaging material according to claim 1, wherein the second minor component of the mixture comprises a partially saponified polyvinyl alcohol.

5. A packaging material according to claim 1, wherein the natural vegetable oil is selected from the group comprising olive oil, rape oil, palm oil, coconut oil, linseed oil, sunflower oil, or a triglyceride mixture of saturated vegetable fatty acids having from about 4 to 14 carbon atoms in their carbon chain.

6. A packaging material according to claim 1, wherein the mixture of compounds forming the coating comprises said natural oil and a mixture of chemically different, chemically-modified starches.

7. A packaging material according to claim 1, wherein the mixture of chemically different compounds forming the coating comprises a mixture of chemically different natural oils selected from the group comprising olive oil, rape oil, palm oil, coconut oil, linseed oil, sunflower oil, or a triglyceride mixture of saturated vegetable fatty acids having from about 4 to 14 carbon atoms in their carbon chain.

8. A packaging material according to claim 1, wherein the coating has an overall content of from about 5 to 150 mg of a chemically modified starch and an overall content of from about 20 to 200 mg of said oil or of a triglyceride mixture of saturated vegetable fatty acids having from about 4 to 14 carbon atoms in their carbon chain, or of a mixture thereof, calculated per square meter of the surface of said layer.

9. A packaging material according to claim 1, in the form of a tubular casing.

10. A sausage product, comprising a sausage filling and surrounding said filling, a casing as defined by claim 9.

11. A process for the preparation of a tubular casing, comprising the steps of coating the inside of a tubular casing based on cellulose hydrate with an aqueous liquid comprising from about 0.2 to 8 percent by weight, based on the total weight of the liquid, of a chemically modified starch, a micro-crystalline cellulose, or a partially saponified polyvinyl alcohol, and from about 2 to 20 percent by weight, based on the total weight of the liquid, of a natural oil, evaporating the volatile components of the liquid, the quantity of liquid applied being selected so that the coating formed on the surface of the tube after evaporation of the volatile components comprises a mixture of chemical compounds comprising a total of from about 20 to 200 mg of natural oil and a total of from about 5 to 150 mg of a chemically modified starch, a micro-crystalline cellulose, or a partially saponified polyvinyl alcohol, calculated per square meter of the surface of the tubular casing.

12. A process according to claim 11, wherein said aqueous liquid further comprises a chemical emulsifier.

13. A process according to claim 11, wherein the liquid comprises an aqueous solution of a chemically modified starch which comprises a natural oil selected from the group of triglycerides comprising olive oil, rape oil, palm oil, coconut oil, linseed oil, sunflower oil, and a triglyceride mixture of saturated fatty acids having from about 4 to 14 carbon atoms in their carbon chain.

14. A process according to claim 11, wherein the aqueous liquid containing the chemical compounds forming the coating comprises from about 0.2 to 2 percent by weight, calculated on the total weight, of a chemical emulsifier selected from the group consisting of an ethyoxylate or propoxylate of a natural fatty acid, a monoester or diester of a natural fatty acid with an aliphatic polyalcohol, an alkyl- or alkyl-aryl-sulfonate, and an alkyl- or alkyl-aryl-sulfate.

* * * * *